United States Patent
Yu (10) Patent No.: US 10,382,661 B2
(45) Date of Patent: Aug. 13, 2019

(54) VISION SENSOR, SYSTEM, AND METHOD FOR IMAGE PROCESSING, AND VISION BASED INTERACTIVE DEVICE

(71) Applicant: Morpx Inc., Hangzhou (CN)

(72) Inventor: Tianli Yu, Hangzhou (CN)

(73) Assignee: MORPX INC., Hangzhou (CN)

( * ) Notice: Subject to any disclaimer, the term of this patent is extended or adjusted under 35 U.S.C. 154(b) by 341 days.

(21) Appl. No.: 15/017,285

(22) Filed: Feb. 5, 2016

(65) Prior Publication Data
US 2016/0239726 A1 Aug. 18, 2016

(30) Foreign Application Priority Data
Feb. 12, 2015 (CN) .......................... 2015 1 0077113

(51) Int. Cl.
*H04N 5/225* (2006.01)
*H04N 5/232* (2006.01)
(52) U.S. Cl.
CPC ....... *H04N 5/2257* (2013.01); *H04N 5/23219* (2013.01); *H04N 5/23229* (2013.01)
(58) Field of Classification Search
CPC ............. H04N 5/2257; H04N 5/23229; H04N 5/23219
USPC ........................................................ 382/103
See application file for complete search history.

(56) References Cited

U.S. PATENT DOCUMENTS

| 2004/0257380 | A1 | 12/2004 | Herbert | |
|---|---|---|---|---|
| 2007/0147698 | A1* | 6/2007 | Reid | ........................ G06T 5/004 382/263 |
| 2010/0091135 | A1 | 4/2010 | Iwamoto | |
| 2010/0315556 | A1* | 12/2010 | Lin | ........................... G06T 3/40 348/581 |
| 2015/0358557 | A1* | 12/2015 | Terre | ...................... H04N 5/2257 348/164 |

FOREIGN PATENT DOCUMENTS

| CN | 101183477 A | 5/2008 |
|---|---|---|
| CN | 101610398 A | 12/2009 |
| CN | 101739548 A | 6/2010 |

(Continued)

OTHER PUBLICATIONS

Li, Zhihui, et al. "Very low resolution face reconstruction based on multi-output regression." Electronics, Computer and Applications, 2014 IEEE Workshop on. IEEE, 2014. (Year: 2014).*

(Continued)

*Primary Examiner* — Amandeep Saini
(74) *Attorney, Agent, or Firm* — Arch & Lake LLP (57) ABSTRACT

A vision based sensor, image processing method and system, and an interactive device including the same are provided. The sensor includes an optical lens, an image acquisition chip that captures image resolution below a first threshold, and a micro-controller. The image acquisition chip acquires an object's image through the optical lens, and output an ultra-low resolution image with a resolution below the first threshold, and sends the ultra-low resolution image to the micro-controller. The micro-controller obtains object information by analyzing the ultra-low resolution image, and sends the object information to an external component, so that the external component performs a predefined act.

13 Claims, 4 Drawing Sheets

(56) References Cited

FOREIGN PATENT DOCUMENTS

CN          102509283 A      6/2012
CN          103929592 A      7/2014

OTHER PUBLICATIONS

Zhou Yi, "Research on Key Technologies of Low Resolution Face Image Recognition", "China Excellent Master's Thesis Full-text Database Information Technology Series", [Y] 5-9, * p. 2-4 *.
Chinese Search Report issued in CN201510077113.6, dated Feb. 12, 2015, 1 page.
First Chinese Office Action (including English translation) issued in CN201510077113.6, dated May 4, 2017, 19 pages.
Second Chinese Office Action (including English translation) issued in CN201510077113.6, dated Oct. 30, 2017, 24 pages.

* cited by examiner

Figure 8

VISION SENSOR, SYSTEM, AND METHOD FOR IMAGE PROCESSING, AND VISION BASED INTERACTIVE DEVICE

CROSS-REFERENCE TO RELATED APPLICATION

This application claims priority to Chinese Patent Application No. 201510077113.6, filed on Feb. 12, 2015, which is hereby incorporated by reference in its entirety.

TECHNICAL FIELD

This disclosure is in the domain of computer vision technology, specifically about a vision sensor, a system and methods for image processing and a vision based interactive device.

BACKGROUND

Visual information is very important to generate intelligent behavior. For human, about 70% of the information received are visual. Computer vision technology may enable a machine to acquire visual information through camera, just like human eyes. With the visual information, a machine may perform human-like intelligent action by sensing the environment, which potentially has many applications. Despite of the great potential, vision based sensor is not widely used in small interactive devices, such as electronic toys. Some common reasons are: a. Processing visual information usually requires large amount of computation resources, such as large internal memory, high processor speed. b. These large amount of computational resources will consume a significant amount of energy. These two factors will significantly increase the manufacture and operating cost of the small interactive devices such as toys.

SUMMARY

According to a first aspect of the disclosure, a vision sensor includes an optical lens, an image acquisition chip that captures image resolution below a first threshold, and a micro-controller. The image acquisition chip acquires an object's image through the optical lens, and output an ultra-low resolution image with a resolution below the first threshold, and sends the ultra-low resolution image to the micro-controller. The micro-controller obtains object information by analyzing the ultra-low resolution image, and sends the object information to an external component, so that the external component performs a predefined act.

According to a second aspect of the disclosure, a method implemented by an apparatus includes: acquiring an ultra-low resolution image with the resolution below a first threshold from an image acquisition chip; obtaining object information by using a predefined algorithm to analyze the ultra-low resolution image in multiple scales, and sending the object information to an external component trigger a response based on the object information.

According to a third aspect of the disclosure, an apparatus for image processing includes a receiver circuitry, an image processing circuitry, and a transmission circuitry. The receiver circuitry is configured to receive an ultra-low resolution image below a first threshold from an image acquisition chip. The image processing circuitry is configured to apply a predefined algorithm to apply multi-scale image processing to extract recognition information. The transmission circuitry is configured to transmit the recognition information to an external component, so that the external component performs a predefined act.

It is intended that the foregoing and the following detailed description be understood only as an illustration of selected forms that the invention may take and not as a definition of the invention. It is only the claims, including all equivalents, that are intended to define the scope of this invention.

BRIEF DESCRIPTION OF THE DRAWINGS

To illustrate the technical solutions in the embodiments of the present disclosure more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DETAILED DESCRIPTION OF THE DRAWINGS

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component may be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. section 112, sixth paragraph, for that unit/circuit/component. Additionally, "configured to" may include generic structure (e.g., generic circuitry) that is manipulated by software and/or firmware (e.g., an FPGA or a general-purpose processor executing software) to operate in manner that is capable of performing the task(s) at issue.

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

In the description of the present disclosure, it should be understand that positions and positional relationships indicated by the terms such as "center", "above", "below", "in front of", "behind", "left", "right", "vertical", "horizontal", "top", "bottom", "inside", "outside" are based on the position or positional relationship shown in the accompany drawings, which are used only for convenient and brief description, and do not indicate or imply that the indicated apparatus or element must be in a specific position, and must be constructed and operated in a specific position. In addition, in embodiments of the present disclosure, an inner end and an outer end are both defined according to directions of signals in a transmission path, that is, according to directions of signals in a transmission path, one end for inputting signals is defined as the outer end or a signal input end of the transmission path, and another end for outputting signals is defined as the inner end or a signal output end. Of course, other names may be defined according to principles, and thus the foregoing may not be understood as a limitation on the present disclosure.

In order to make the goal, feature and advantage of this application clear, we will give more detailed information about the specification of this disclosure with the help of attached figures.

This disclosure is about a vision sensor, which may be used in small intelligent interactive devices such as smart toys. This disclosure allows those devices to acquire external information through a camera, just as the human do, which may mimic a certain intelligent behavior like human with their eyes.

This disclosure is about a more economical vision sensor, which includes: optical lens, image acquisition chip whose resolution is no higher than the first threshold, and a micro-controller. The image acquisition chip acquires the image of an object from the optical lens, output an image with resolution no higher than the first threshold, and output this ultra-low resolution image to the micro-controller. The micro-controller analyzes the ultra-low resolution image, and generates the recognized information, and passes the information to one or more external components, so they may trigger the one or more external components to generate a response. The response may include one or more predefined acts. For example, the vision sensor may be attached to a toy. When the toy receives the information from the vision sensor, the toy may instruct a speaker in the toy to play a stored sound. Alternatively or additionally, the toy may perform other predefined acts when receiving the information from the sensor.

For example, the first threshold may be 96×96. In addition, the image resolution output by the image acquisition chip is above the second threshold, the second threshold is lower than the first threshold.

Alternatively or additionally, the above micro-controller includes in itself the SRAM and flash memory to store the ultra-low resolution image. The size of the SRAM is not higher than 32 KB and the flash memory size no higher than 256 KB.

Alternatively or additionally, the visual sensor in this disclosure also includes the power supply circuitry for the image acquisition chip and micro-controller. The power supply circuitry comprises at least one of the following: Lithium battery power supply circuitry, Alkaline battery power supply circuitry, button battery power supply circuitry, solar cell power supply circuitry. The solar cell power supply circuitry is comprised of the solar cell panel, solar power controller and battery.

In addition, this disclosure provides a set of image processing methods to be used in the above vision sensor. In the method, the vision sensor acquires an image whose resolution is below the first threshold. The vision sensor uses predefined algorithms to perform multi-scale image analysis to acquire recognition information. The vision sensor then sends the recognized information to external components so that they may trigger response based on the recognized information.

Alternatively or additionally, the above predefined algorithms to perform multi-scale analysis for the ultra-low resolution image to extract object recognition information, are comprised of: Preprocessing the ultra-low resolution image acquired from the image acquisition chip. Rescaling the preprocessed original sized image into multiple predefined scales. Using a predefined sized detection window to scan the above multi-scale image, and at the same time buffering the image rows that covered by the above detection window and recognizing objects from the buffered rows.

Alternatively or additionally, the above obtained recognition information comprised of at least one of the following: human face detection information, human face recognition information, facial expression recognition information, object detection and tracking information, environment recognition information. More precisely, the face detection information is extracted by detecting face in the ultra-low resolution image. The face recognition information is extracted by first detecting face and then recognizing the identity of the image from a ultra-low resolution image. The facial expression recognition information is extracted by first detecting the location of the face and then recognizing the facial expression in the ultra-low resolution image. The object recognition and tracking information is extracted by recognizing object and its location in the ultra-low resolution image. The environment recognition information is extracted by recognizing different environment in the ultra-low resolution image.

In addition to the image processing methods, this disclosure also provides a system for image processing, to be used in the above vision sensor, comprises of: receiver module, to receive the image whose resolution is no higher than a first threshold. The image processing module is configured to use predefined algorithm to process the ultra-low resolution image using multi-scale analysis to get recognition information. Transmission module is configured to send the recognized information to external unit, to trigger external response based on the recognition information.

Alternatively or additionally, the image processing module mentioned above includes: a preprocessing unit, which preprocesses the ultra-low resolution image acquired from the image acquisition chip. The image processing module may further include mage scaling unit, which scales the preprocessed image into a predefined set of scales. Image scanning unit, which use predefined sized detection window to scan the multi-scale image, buffers the image rows that covered by the current detection window. The recognition unit, which uses predefined algorithms to recognize object information from the buffered image rows. For example, the image processing module may process multiple rescaled images sequentially.

In addition, this disclosure also discloses a vision based interactive device, comprised of: storage device, one of the vision sensor mentioned above, driver device, and at least one of the controlled device. The controlled device may include one or more of the following: a mechanical motion device, a display device, and an audio playback device. The storage device includes the control parameter database, which stores the control parameter data corresponds to various recognized object information. The driver device is used to find the corresponding control parameters of the recognized objection information output by the vision sensor, and use those control parameters to execute the control instructions.

The vision sensor, system and methods for image processing and vision based interactive device disclosed in this disclosure, works by using low resolution lens to form object image, and acquire it using ultra-low resolution image sensor, which then give to micro-controller for recognition using predefined algorithms. Because of the use of low-resolution optical lens and the ultra-low resolution image during acquisition, the required storage space for image is very small compared to other solutions. These requirement may be easily met by the on-chip SRAM of many micro-controller, and therefore reduce the storage requirement and computation requirement of the proposed vision sensor, which in turn reduces the complexity of the circuitry and power consumption. In addition, because of the low requirement of optical lens quality and low resolution requirement of the image acquisition chip, the manufacture cost of the proposed vision sensor may be greatly reduced.

Figure 1:
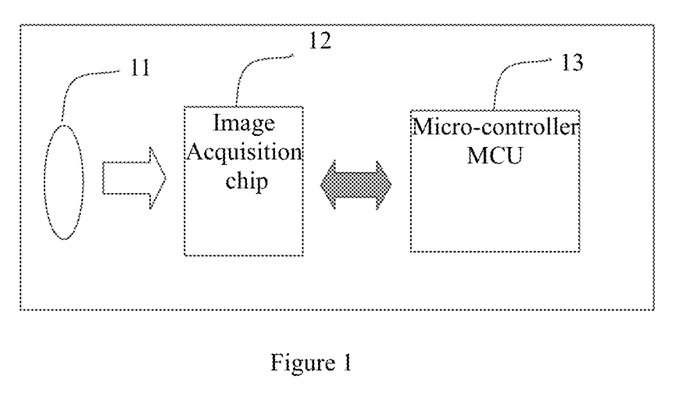
FIG. 1 illustrates a block diagram of the proposed vision sensor.

FIG. 1 shows the structure diagram of the vision sensor implementation, which includes: an optical lens 11, an image acquisition chip 12, and a micro-controller 13.

In FIG. 1, the optical lens 11 is a low resolution lens. The object image passed through the lens and the converted digital image has a resolution no higher than the first threshold.

The image acquisition chip 12 output a digital image resolution no higher than the first threshold. This threshold is determined by the image recognition algorithm runs on the micro-controller. If CMOS (Complementary Metal-Oxide Semiconductor) or CCD (Charge Coupled Device) pixels are used to represent the resolution of the digital image, the resolution No. 1 may be 96×96. This means the output of the image acquisition chip will not be higher than 96×96 pixels.

Furthermore, the output resolution of the above image acquisition chip is not lower than the second threshold, the second resolution may be 32×32 or 12×12.

Micro-controller 13 has internal SRAM and flash memory. The SRAM and flash memory is used to store the ultra-low resolution image acquired by the image acquisition chip and other generated data during image processing steps. Specifically, SRAM is a type of internal memory, which may be used to store the temporary computation data when the CPU is running the image processing pipeline. Flash memory is a long term permanent storage device and may hold data even when the power is lost. Flash memory is usually used to store static data such as object feature models and other configuration data.

Due to the use of ultra-low resolution in the image acquisition chip, the resolution is usually no higher than 96×96. For an image of 96×96 pixels, the pre-processed gray scale image only needs less than 9 KB of memory. For a grayscale image of 32×32, only 1 KB memory is required. These low resolution image may be directly stored in the internal SRAM (Static Random Access Memory), and does not need additional off-the-chip storage device. Because of this reason, the vision sensor in this disclosure may use a micro-controller with relative small memory, such as 32 KB SRAM and 256 KB flash memory.

The vision sensor in this disclosure works as the following: the object inside the view port of the optical lens 11 produces an image through the lens. The image acquisition chip acquires the object's image, converts it to an ultra-low resolution digital image, and passes it to the micro-controller 13. The micro-controller 13 analyzes the ultra-low resolution image, generate recognition information and pass the recognition information to external components, so that certain responses may be triggered.

The external components in the disclosure may include one or more of the following: a display device, an audio devices, a driver device for motion equipment, or a high level controller. The vision sensor in this disclosure may directly control other servos, display devices, and audio devices to form a complete and independent interactive system. Alternatively or additionally, the vision sensor may be implemented in a subsystem to pass the processed information to a high level controller.

Figure 2A:
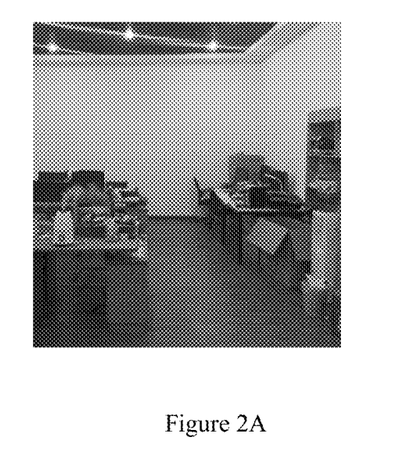
FIG. 2A illustrates a high resolution image captured by other existing system.
Figure 2B:
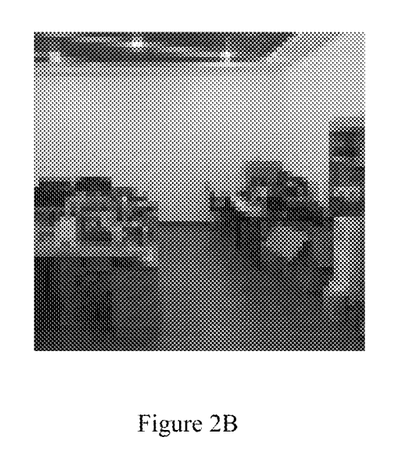
FIG. 2B illustrates an ultra-low resolution captured by the vision sensor in this disclosure.
Figure 2C:
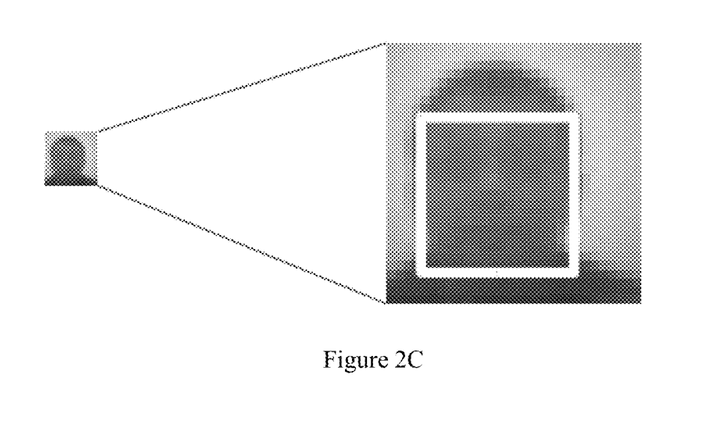
FIG. 2C illustrates an original image used for face recognition captured by the vision sensor.

FIG. 2A shows the full resolution image acquired by other existing technology. FIG. 2B is the ultra-low resolution image acquired in this disclosure. And FIG. 2C shows the original ultra-low resolution image acquired for face recognition purposes. These figures show that this disclosure overcomes the general population's belief that a higher image resolution is always better. Instead, the devices in the disclosure use low resolution optical lens for imaging, and use low resolution image acquisition chip for image acquisition, and output an ultra-low resolution digital image. These ultra-low resolution image are used for object recognition using predefined algorithms in the micro-controller. Because of the ultra-low resolution image from the image acquisition chip, the preprocessed image such as the grayscale image needs very little storage space, and may be directly placed in the internal SRAM of the micro-controller. This eliminates the external storage chip, reduces the vision sensor's storage and computation requirement, which in turn reduces the circuitry complexity and power consumption.

All these advantage may be effectively used to reduce the vision sensor's manufacture cost.

Furthermore, since the image resolution is so low, the required precision of the optical lens does not need to be high either. This further reduces the vision sensor's manufacture cost.

In addition, since the vision sensor's acquired digital image is of low-resolution, like those in FIGS. 2B and 2-3, even if the image processed in the micro-controller is leaked unintentionally, it is very hard to recognize detailed information from these images. This property effectively protects user's privacy and improves their information security.

This disclosure also provides a vision sensor's implementation, in addition to the implementation discussed above, a power supply circuitry may be added to provide power for the image acquisition chip and micro-controller. The power supply circuitry may be lithium power supply circuitry, alkaline power supply circuitry or button battery supply circuitry. These power supply may provide the needed voltage for the vision sensor, such as supplying at 3.3 volt.

Because the vision sensor in this disclosure uses ultra-low resolution image for object recognition, the memory consumption is greatly reduced, and at the same time, the computational resources of the micro-controller is also greatly reduced during processing the ultra-low resolution image. The power consumption of the vision sensor is quite small, usually less than 100 mW, which may be provided by even the most common alkaline battery. This further reduces the manufacture cost of the vision sensor.

To move further forward, the disclosure may be implemented using a simple solar cell power supply, which includes solar panel, solar energy controller and storage battery. The solar cell solution may also be more environment friendly.

Table 1. lists the detailed specification of an implementation of the vision sensor:

| | |
|---|---|
| PCB size | 3 cm × 3 cm |
| Image acquisition chip | OmniVision ov7670 |
| Micro-controller | AVR series ATmega1284P or STM32 series STM32F103CBT6 |
| Operating voltage | 3.3 V |
| Operating current | 30 mA |
| Overall power consumption | 100 mW |

In Table 1, the micro-controller AVR series ATmega1284P has a main frequency of 16 MHz, 16 KB SRAM and 128 KB flash memory. The STM32 series STM32F103CBT6 has a main frequency of 72 MHz, 20 KB SRAM and 128 KB flash memory.

Figure 3:
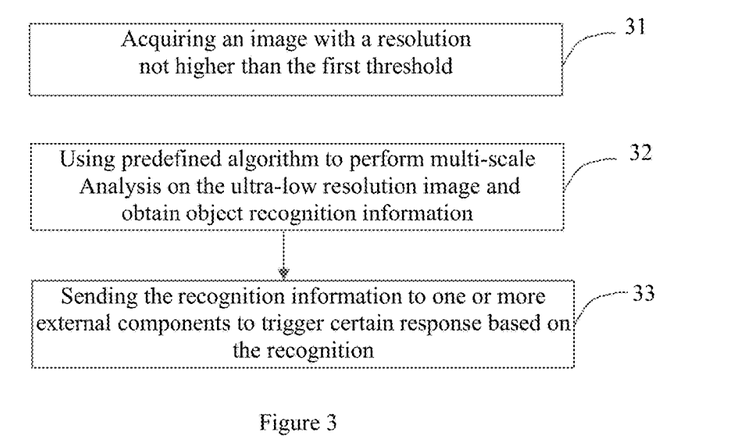
FIG. 3 illustrates a flow diagram of the image processing method.

In addition, this disclosure also provides a method for image processing that may be applied in any of the previously mentioned vision sensor. The method may be implemented by the micro-controller. As shown in FIG. 3, the method includes the following:

Step 31, acquire an image with a resolution not higher than the first threshold. This threshold may be 96×96.

Step 32, Use predefined algorithms to perform multi-scale analysis on the image to obtain object recognition information. The predefined algorithms include: Low resolution face detection algorithm based on boosting. LBP (Local Binary Patterns) feature based human face recognition algorithm or other image classification algorithm. The object recognition information obtained using predefined algorithm includes at least one of the following: Human face detection information, human face recognition information, facial expression recognition information, object detection and tracking information and environment recognition information. Human face detection information may be used to find the face location in the low resolution image. Human face recognition information may be used to identify a face after the face is detected in the ultra-low resolution image. Facial expression information may be used to detect which expression is present in in the image. Object detection and recognition information may be used to get the object location and classification in the image. Environment recognition information may be used to identify the environment from the current image.

Figure 5:
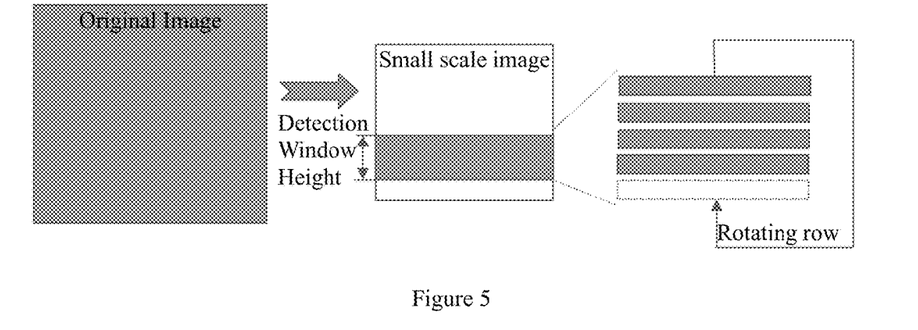
FIG. 5 illustrates a row by row buffering proposed by this disclosure.

Face detection information may be obtained using boosting based algorithm to perform multi-scale analysis of the ultra-low resolution image. This algorithm will require the use of integral image, and integral image may be calculated using the row based buffering method as shown in FIG. 5. In the human face detection model, in order to adapt to the ultra-low resolution image, all the training image are scaled to a resolution of 12×12. The detection accuracy may still be preserved by add more cascaded classifiers. The resulting model has a detection window of 12×12 (i.e. both the width and the height of the window are 12 pixels). Based on this detection model, the scanning window height is also reduced to 12 rows, which effectively reduce the required memory.

The human face recognition information may be obtained using the following procedure: The human face recognition is based on human face detection. After detecting the human face, the face region is cropped out and used to extract face features such as the LBP feature. The extracted feature vector is compared to a previously saved feature database, to find the closest face feature. Due to the use of ultra-low resolution image, the above method might get many confusing faces. However, in the case of interactive toys, only a small number of faces need to be distinguished and the proposed method still works.

The facial expression information may be obtained using the following: Facial expression recognition is also based on face detection, face features are extracted at the detected face location and SVM (Support Vector Machine) classifier is used to classify the feature vector into different expression categories.

Object detection and tracking information may be obtained as the following: For a common geometric object, such as a circle, a ball or a square, generalized Hough transform may be applied. Specifically, the edge map of the input image at a certain scale is scanned from top to bottom, some voting statistics of the geometric parameter are accumulated in the buffer and finally the global maximum in the accumulation buffer shows the location and other parameter of the geometric object. During the row by row scanning the row based buffering shown in FIG. 5 may also be used.

The environment recognition information may be obtained using the following: the entire image may be used to extract a feature vector, and use SVM to classify the extracted feature into different categories, such as indoor, outdoor, beach, park, etc.

Step 33, the micro controller may send the recognition information may to one or more external components, so that these external components may trigger certain responses to the recognized information.

The external components may be display devices, audio devices, the driver devices of motion equipment, or they may be other upper level controllers.

Figure 4:
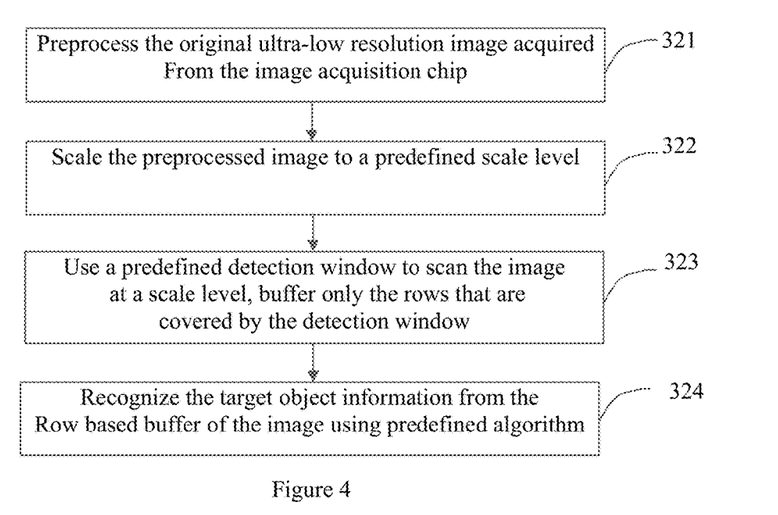
FIG. 4 illustrates a flow diagram of the Step 32 in FIG. 3.

FIG. 4 shows more details of the implementation of Step 32, which includes the following:

Step 321, perform preprocessing on the acquired ultra-low resolution image from the image acquisition chip.

Based on the method shown in FIG. 5, during the recognition step, the original image is first transformed into a preprocessed image of the same size. The preprocessed image is stored in SRAM. The preprocessed image may be a gray scale image of the same size or a color image with noise removed.

Step 322, Scale the preprocessed image from original size to a predefined image scale.

The scaling process may be implemented as the following: For example, starting from the original scale, divide the scale space into 4 levels, the original image size, 75% of the original image size, 50% of the original image size, and 25% of the original image size. Please note that the exact number of scale levels is not limited to the example given here.

Step 323, Use a detection window of a predefined size to scan the image, buffer the rows that are covered by the detection window.

During the multi-scale image analysis, the original image has to be scaled to a predefined size at each scale. Due to the limited size of internal memory of the micro-controller used in the implementation, it is usually impossible to store multiple such images. To solve this problem, this disclosure uses row based buffering method, as shown in FIG. 5. When the predefined detection window is scanning the image at certain scale, only the image rows that are covered by the current detection window need to be stored in memory. When the detection window moved to the next row, the first row in the buffer may be released and used to store the new row. By rotating the storage space for different rows, we may save the memory space.

Step 324, Recognize object information from the row based buffer using predefined algorithm.

Based on this algorithm, we first perform image analysis at the first image scale to decide if there are target object in the image. If no target is detected, the image is resized to the second image scale and the detection algorithm runs again to find the target. The process repeats until the target object is found.

The object recognition information includes at least one of the following: Human face detection information, human face recognition information, facial expression recognition information, object detection and tracking information and environment recognition information. Human face detection information may be used to find the face location in the low resolution image. Human face recognition information may be used to identify a face after the face is detected in the ultra-low resolution image. Facial expression information may be used to detect which expression is present in the image. Object detection and recognition information may be used to get the object location and classification in the image. Environment recognition information may be used to identify the environment from the current image.

Corresponding to the implementation of the image processing method, this disclosure also discloses the system for image processing.

Figure 6:
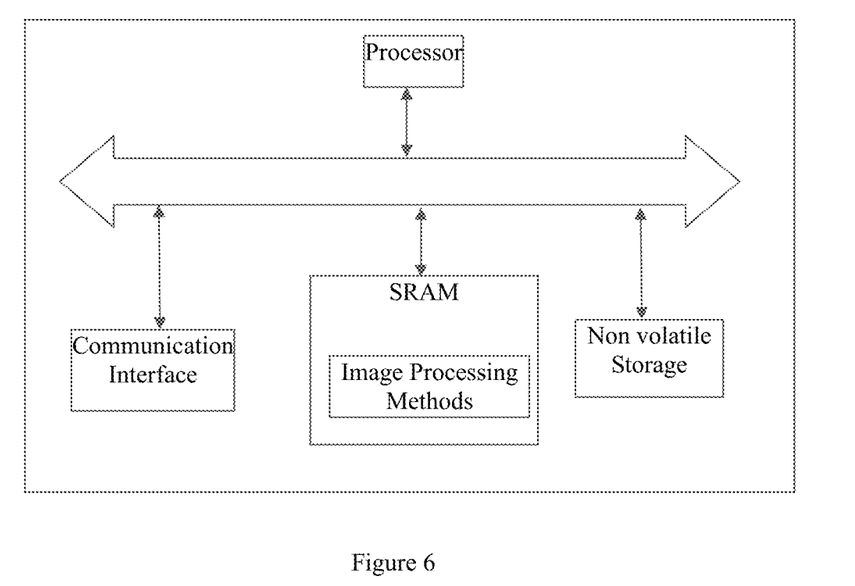
FIG. 6 illustrates a hardware architecture of the micro-controller that is used as the image processing device of this disclosure.

The system for image processing in this disclosure may be applied to any of the vision sensor implementation. The system may be implemented in software, or it may be implemented using hardware or a combination of software and hardware. Using software implementation as an example, as a logic unit device, the device is using it's processor to read the computer instructions from the flash memory and execute them. From the perspective of the hardware, as shown in FIG. 6 a hardware structure diagram for the device. Besides the processor, communication interface, SRAM and flash memory (FIG. 6), the micro-controller in the implementation device may have other hardware, such as the chip that is responsible for the message communication. For the sake of concise, we do not list all the details in FIG. 6.

Figure 7:
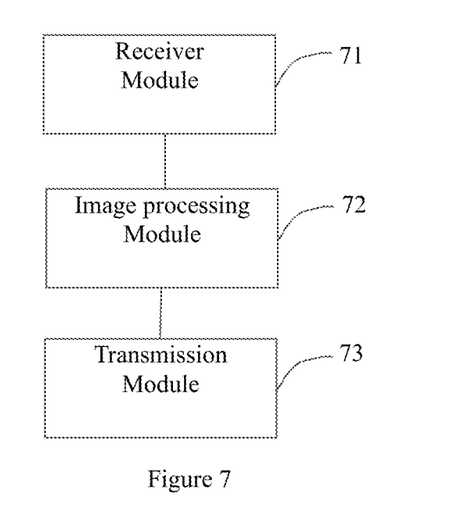
FIG. 7 illustrates a structure diagram of an example of the image processing device.

FIG. 7 shows the block diagram of the implementation for the image processing device, which includes: a receiving module 71, an image processing module 72, and a transmitter module 73.

The receiving module 71 is configured to receive the ultra-low resolution image with the resolution no higher than the first threshold.

The image processing module 72 is configured to use predefined algorithms to perform multi-scale image analysis to the ultra-low resolution image to obtain object recognition information.

The transmitter module 73 is configured to send the object recognition information to external components, allowing those components to trigger certain responses based on the recognition information.

More specifically, the image processing module 72 includes the following: a preprocessing unit, an image scaling unit, an image scanning unit, and an object recognition unit. The preprocessing unit performs preprocessing to the original ultra-low resolution image. The image scaling unit scales the original input image into different predefined scale levels. The image scanning unit uses a predefined detection window to scan the image at predefined scale level. The object recognition unit recognizes the object information from the row based buffer using predefined algorithm. The predefined detection window may have different shapes according to the particular application, where the shape of the predefined detection window may be defined by a contour of the detection window.

Figure 8:
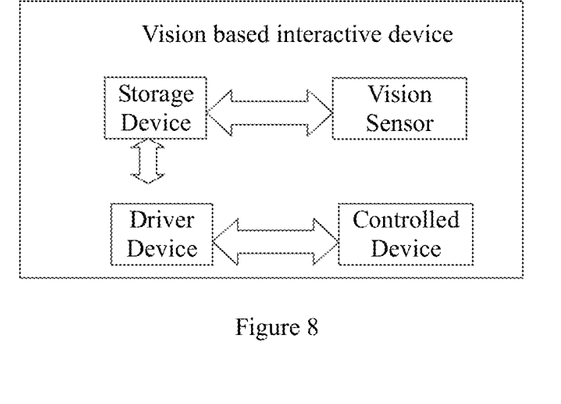
FIG. 8 illustrates a structure diagram of the vision based interactive device.

In addition, this disclosure also disclose an vision base interactive device, as show in FIG. 8 the implementation block diagram of this vision based interactive device, includes: storage device, any of the previously mentioned vision sensor implementation, driver device, and at least one controlled device. The controlled devices may be any of the following: a mechanical motion device, a display device, an audio player devices, etc.

The control parameter database is stored in the storage device. The control parameter database includes various control parameters corresponding to different object recognition information. The driver device will find the control parameters in the database that match the object recognition information from the vision sensor, and drive the controlled device based on these parameters.

One of the embodiments of the vision based interactive device may be an electronic toy that has vision based interactive functionalities. For example, the vision sensor may be embedded in certain place of the toy. The whole sensor may be disposed in the toy's eye. The camera module including optical lens and image acquisition chip may be disposed in the toy's eye, mouth, nose or other places that are relatively hidden from the user. The location of the vision sensor ensures that the vision sensor has maximal field of view and may capture the objects and scene in front of the toy to generate response. Specifically, when setting the position of the whole vision based sensor or the camera module of the vision sensor, it may be preferred to make sure the optical axis of the lens be parallel or near parallel to the horizontal level, so that the vision sensor has maximum effective viewing angle and range.

When the controlled device receives the detected external signal from the vision sensor, and obtain the object recognition information, the driver device will trigger to execute the matching operations. For example, when the vision sensor detects a human face, the audio player will play a "hello" sound. Or if a smiling face is detected, the display device will show a smiley face. When the detected scene is an amusement park, the audio player will play a cheering sound and the mechanical motion device will perform a hand clapping motion, etc.

The above part only serves as the purpose of a desired implementation, which is in no way of limiting this disclosure. Any modification, replacement and improvement under the spirit or principle of this disclosure, should be included in the area of protection for this disclosure.

What is claimed is:

1. A vision sensor, comprising:
an optical lens, an image acquisition chip that captures image resolution below a first threshold, and a micro-controller;
wherein the image acquisition chip acquires an object's image through the optical lens, and output an ultra-low resolution image with a resolution below the first threshold, and sends the ultra-low resolution image to the micro-controller;
wherein the micro-controller obtains object information by analyzing the ultra-low resolution image, and sends the object information to an external component, so that the external component performs a predefined act involving a toy;
wherein the ultra-low resolution image has a resolution between 12×12 and 96×96; and
wherein the micro-controller is configured to analyze the ultra-low resolution image in multiple scales by performing acts comprising:
preprocessing the ultra-low resolution image from the image acquisition chip;
rescaling the preprocessed image into predefined scales;
using a predefined detection window to scan rescaled image at each predefined scale, and at the same time buffering pixel rows covered by the current position of the predefined detection window; and
obtaining the object information by using a predefined algorithm to analyze the buffered pixel rows.

2. The vision sensor of claim 1, wherein the first threshold is a resolution of 96×96, and the resolution of the image acquisition chip is above a second threshold; and wherein the second threshold is lower than the first threshold.

3. The vision sensor in claim 1, wherein the micro-controller further comprises static random access memory (SRAM) and flash memory to store the ultra-low resolution image, wherein the SRAM has a storage size that is not greater than 32 KB and the flash memory has a storage size that is not greater than 256 KB.

4. The vision sensor of claim 1, further comprising:
a power supply circuitry to power the image acquisition chip and micro-controller;
wherein the power supply circuitry comprises at least one of the following: a lithium battery, an alkaline battery, a button battery, and a solar cell.

5. The vision sensor of claim 1, wherein the micro-controller is configured to analyze the ultra-low resolution image in multiple scales.

6. The vision sensor of claim 5, wherein the object information comprises at least one of following information: human face detection information, human face recognition information, facial expression information, object tracking and recognition information, and environment recognition information.

7. An interactive device, comprising:
a storage device, a vision sensor, a controller component, and at least one of: a mechanical motion device, a display device, and a sound player device,
wherein the vision sensor comprises an optical lens, an image acquisition chip that captures image resolution below a first threshold, and a micro-controller;
wherein the image acquisition chip acquires an object's image through the optical lens, and output an ultra-low resolution image with a resolution below the first threshold, and sends the ultra-low resolution image to the micro-controller;
wherein the micro-controller obtains object information by analyzing the ultra-low resolution image, and sends the object information to the interactive device, so that the interactive device performs a predefined act involving a toy;
wherein the storage device stores the control parameter database including one or more control parameters correspond to various recognized object information;
wherein the ultra-low resolution image has a resolution between 12×12 and 96×96; and
wherein the micro-controller is configured to analyze the ultra-low resolution image in multiple scales by performing acts comprising:
preprocessing the ultra-low resolution image from the image acquisition chip;
rescaling the preprocessed image into predefined scales;
using a predefined detection window to scan rescaled image at each predefined scale, and at the same time buffering pixel rows covered by the current position of the predefined detection window; and
obtaining the object information by using a predefined algorithm to analyze the buffered pixel rows.

8. The interactive device of claim 7, wherein the controller device looks up the control parameter from the control parameter database that correspond to the recognized object information, and drive the controlled device to execute the control parameters.

9. The interactive device of claim 7, wherein the first threshold is a resolution of 96×96, and the resolution of the image acquisition chip is above a second threshold; and wherein the second threshold is lower than the first threshold.

10. The interactive device of claim 7, wherein the micro-controller further comprises static random access memory (SRAM) and flash memory to store the ultra-low resolution image, wherein the SRAM has a storage size that is not greater than 32 KB and the flash memory has a storage size that is not greater than 256 KB.

11. The interactive device of claim 7, further comprising:
a power supply circuitry to power the image acquisition chip and micro-controller;
wherein the power supply circuitry comprises at least one of the following: a lithium battery, an alkaline battery, a button battery, and a solar cell.

12. The interactive device of claim 7, further comprising:
an image processing circuitry configured to apply a predefined algorithm to apply multi-scale image processing to extract recognition information.

13. The interactive device of claim 12, wherein the image processing circuitry is configured to:
preprocess the ultra-low resolution image acquired from the image acquisition chip;
scale the ultra-low resolution image to obtain a scaled image at a predefined scale;

apply predefined detection window to scan the scaled image, and buffer pixel rows of the scaled image covered by the predefined detection window; and apply the predefined algorithm to recognize object in the buffered pixel rows.

* * * * *